United States Patent [19]
Wallace et al.

[11] Patent Number: 5,672,924
[45] Date of Patent: Sep. 30, 1997

[54] ROBOTS USING MODULAR DIRECT DRIVE MOTORS

[75] Inventors: Richard S. Wallace, Easton, Pa.; Frederick B. Hansen, New York, N.Y.

[73] Assignee: New York University, New York, N.Y.

[21] Appl. No.: 704,300

[22] Filed: Oct. 15, 1996

[51] Int. Cl.⁶ .............................. H02K 1/27; H02K 3/46; H02K 33/12
[52] U.S. Cl. .................. 310/152; 310/156; 310/46; 310/36; 310/38; 310/67 R; 901/23
[58] Field of Search ..................... 310/156, 152, 310/46, 36, 38, 67 R, 89, 164; 180/8.1; 901/23, 24

[56] References Cited

U.S. PATENT DOCUMENTS

| | | | |
|---|---|---|---|
| 4,227,164 | 10/1980 | Kitahara | 310/36 |
| 4,795,929 | 1/1989 | Elgass et al. | 310/36 |
| 4,797,061 | 1/1989 | Munakata | 901/23 |
| 5,160,877 | 11/1992 | Fujiwara et al. | 901/30 |
| 5,293,107 | 3/1994 | Akeel | 310/83 |
| 5,327,032 | 7/1994 | Esswein | 310/36 |
| 5,355,743 | 10/1994 | Tesar | 901/23 |
| 5,523,662 | 6/1996 | Goldenberg et al. | 901/23 |

FOREIGN PATENT DOCUMENTS 1310879  12/1989  Japan ........................ 901/23

*Primary Examiner*—Thomas M. Dougherty
*Assistant Examiner*—B. Mullins
*Attorney, Agent, or Firm*—Eliot S. Gerber

[57] ABSTRACT

A direct drive robot motor may be used for the arms, legs, eyes and fingers of a robot. The motor comprises a rotor, having a permanent magnet, and a tubular arm portion, which is integral with the rotor and extends outwardly through a slot in a stator body. The stator body is wound with an aluminum coil and has a tubular extension to link it with the arm of another direct drive motor.

28 Claims, 4 Drawing Sheets

ROBOTS USING MODULAR DIRECT DRIVE MOTORS

FIELD OF THE INVENTION

The present invention relates generally to modular direct drive robot motors and to legged mobile robots that are capable of maintaining balance while walking and turning.

BACKGROUND OF THE INVENTION

A robot is a programmed manipulator engineered to perform useful work automatically, without human intervention. Robots are useful for handling various tasks in industry and entertainment. In industry, they can increase production as well as relieve human operators from tasks that are excessively burdensome, boringly routine, or dangerous. In entertainment, they can represent realistic looking persons or beings such as those featured at theme parks.

Some robots are designed for flexibility and for transportability with the intention of having the robot move itself about and perform various tasks. Typically, the robot has mechanical arms and hands, with freedom of movement roughly equivalent to that of a human waist, shoulder, elbow and wrist. The robot also has a device that permits it to move. Such devices may be wheels, continuous treads, legs with joints, or legs with pistons. The wheels, treads or legs may be powered by a hydraulic or pneumatic system or by an electric motor. However, such devices may have a number of limitations: robots may be heavy, imprecise in their movements, relatively slow, and costly. In addition, the robots with wheels or treads may not be able to climb stairs or move over rough ground.

The related patent art shows long-standing efforts to provide a robot which has an efficient device for walking. U.S. Pat. No. 4,834,200 (Kajita et al) discloses a walking robot which has a pair of expandable and contracting legs. The robot has a number of activators which produce swinging motions between hip, foot and ankle. The robot moves by adjusting a length dimension of the leg and ankles between each foot and leg.

More recently, U.S. Pat. Nos. 5,455,497 and 5,513,106 (Hirose et al) disclose state-of-the-art robotic technologies. In the Hirose references, issued in 1995 and 1996, a walking robot is powered by an electric motor at each joint which drives a transmission through a belt or a chain.

In addition, there have been efforts to provide robots powered by direct drive type motors. The direct drive motor of a robot is an actuator directly coupled to a load, i.e., the output shaft of the motor is the pivoting shaft of a rotor's joint. In the direct drive, mechanical gearing and other transmission elements between actuator and load are eliminated. Such motors improve motion capability of the robot through reduction of functional torque and inertia and enhance the compactness of the robot's joints by omitting a reduction gear or transmission.

Nevertheless, the technical feasibility of walking robots using direct drive motors has been in doubt because motors were not available with high enough "torque to weight ratio", e.g., the output power (torque) was not sufficient compared to the weight of the motor. Many direct drive motors also have a number of other limitations. At the present time, generally copper or brass is used to wind the coils of such direct drive motors. Copper (or brass) has several advantages: it is low in cost, high in electrical capacity, and readily available. However, a problem with direct drive motors may be overheating. Operation of the robot may require considerable power. The copper (or brass) coils, which are being used for the robot's motor, may heat up rapidly due to the high power requirements. So, the robot joints can be operated only for a short period of time without overheating of the motor coils. To control the problem of overheating, the robot may be operated only with relatively low power (underpowering) or with frequent and prolonged stopping of its motion. Underpowering leads to low torque; the robot may not be able to support itself or move its joints or eyes in a realistic or efficient way if its power is limited by heat dissipation of its copper coils.

SUMMARY OF THE INVENTION

This invention provides a direct drive motor and a robot which has at least two legs. This is a new generation of lightweight open magnetic circuit motors capable of functioning as joints in a direct walking machine. Each leg has at least three links, each link being a joint which is powered by a modular direct drive motor. The motor operates a shaft in limited rotation, for example 90°, at a very high speed. Such motors provide the robot with the capability to walk and climb the stairs. The direct drive motor may also be used for other purposes, for example, to operate a remote controlled toy, airplane, or vehicle or to move the eyes or fingers of a robot. The robot, in its four legs embodiment, is economical in its use of power and may be operated, without recharging of its battery, for prolonged periods of time.

Direct drive means that the joints are moved directly by actuators which are physically aligned with the joint axis. There are no gears, belts or chains used for transmission of torque. Each link consists of a direct drive motor comprising a plastic stator, preferably epoxy glass, two aluminum coils wound around the stator, and a rotor having permanent magnets. The rotor carries an arm which may be rotatable 90° in a plane. The free end of the arm is tubular and removably snaps into the base of the next direct drive motor to form a series of links.

The present invention also deals with the problem of overheating of the direct drive motor. Instead of using "conventional" materials, such as copper or brass, for the coils, aluminum is used. The main advantage is that aluminum dissipates heat faster than copper. It also solves the problem of underpowering, by allowing the robot to work longer with shorter interruptions to cool the coils. Since the coils dissipate heat faster, the motor "shut-down" time (resting time) is shorter.

In addition, a heat sensor is attached to the arm. When the temperature of the coils rises to the predetermined point, the robot is programmed to automatically go into "a cool-off mode" in which the motor shuts down, and its coils cool off.

The robot's cool-off mode consists of a number of steps. First, the robot sends a signal to a control center or an operator warning that it is going into the cool-off mode. Second, the robot stops performing its operations (except for walking); then, for example, it may walk to a docking port where it shuts down. The docking port is a device which can support the robot during the cool-off period. Such port may also be used to recharge the robot (assuming the robot has a portable battery). In addition, the robot may use the port to download or upload data, such as certain measurements or video images.

BRIEF DESCRIPTION OF THE DRAWINGS

The following detailed description of the preferred embodiment of the invention should be taken in conjunction with the accompanying drawings. In the drawings.

DETAILED DESCRIPTION

Figure 1:
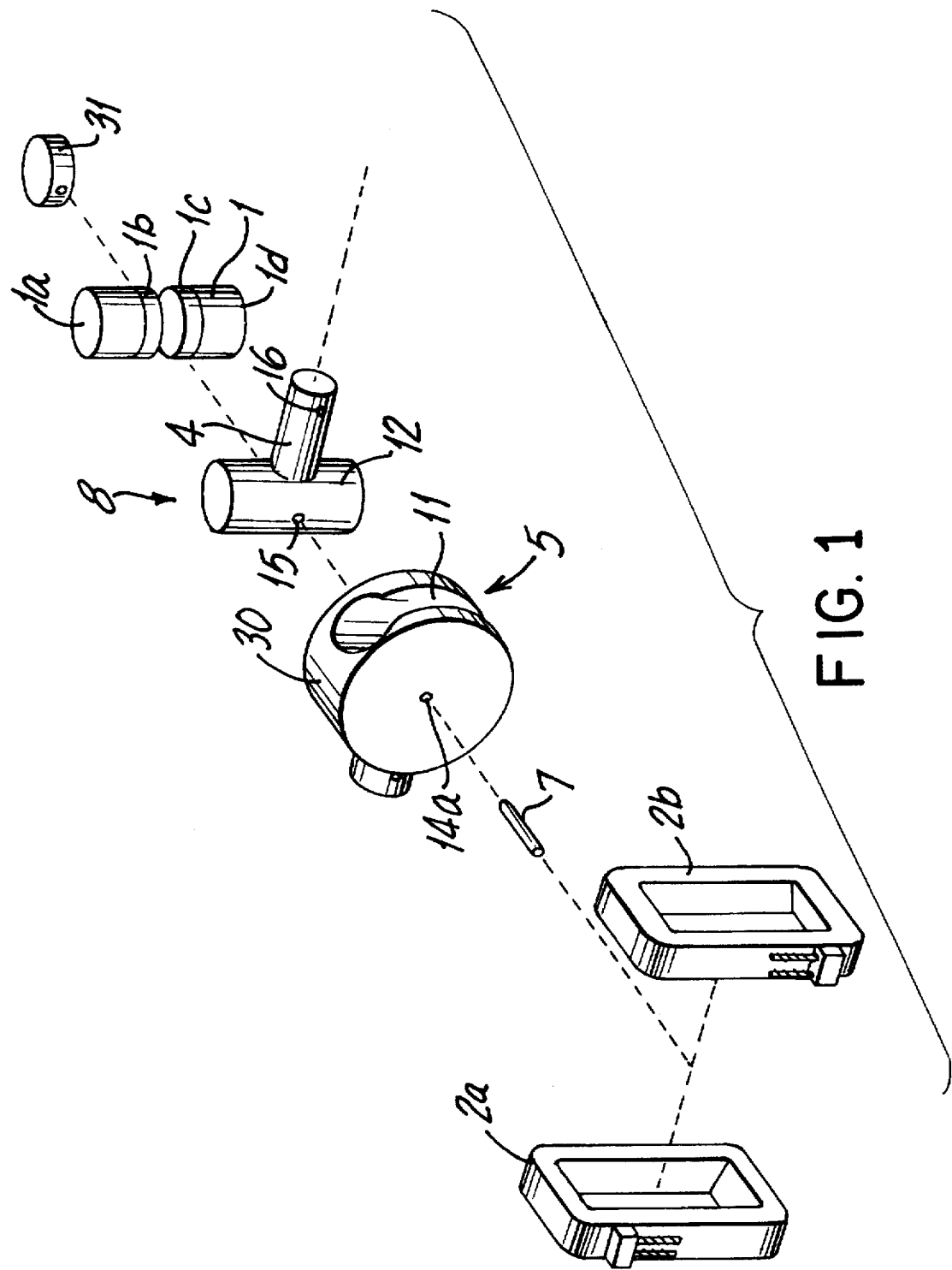
FIG. 1 is a perspective expanded view of a modular direct drive motor showing a rotor, stator, coils, shaft and the means for attachment to the previous and subsequent links.
Figure 2:
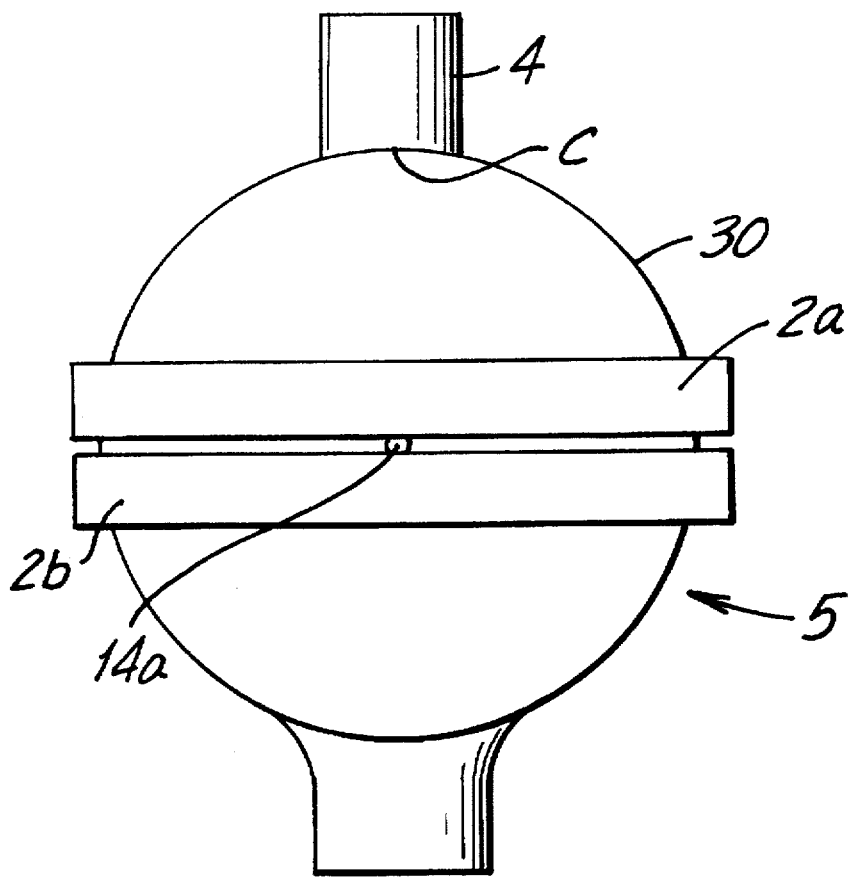
FIG. 2 is a side view of a modular direct drive motor.
Figure 3:
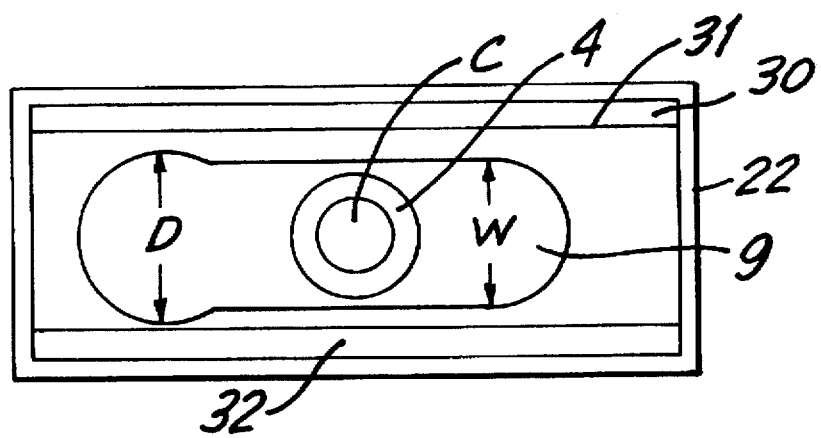
FIG. 3 is a top view of a modular direct drive motor.
Figure 4:
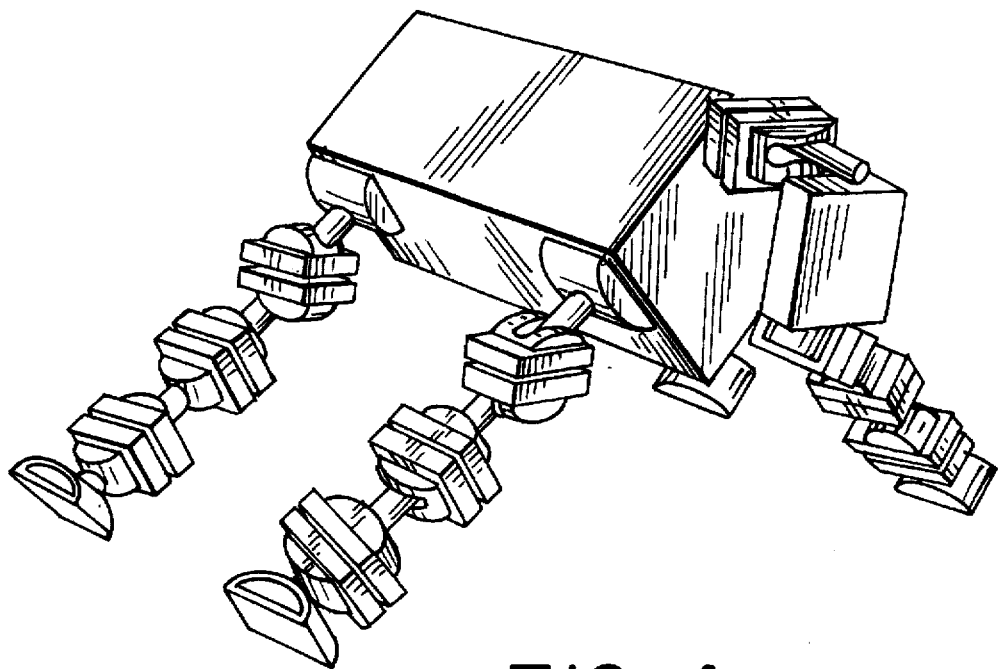
FIG. 4 is a perspective view of a four-legged walking robot.
Figure 5:
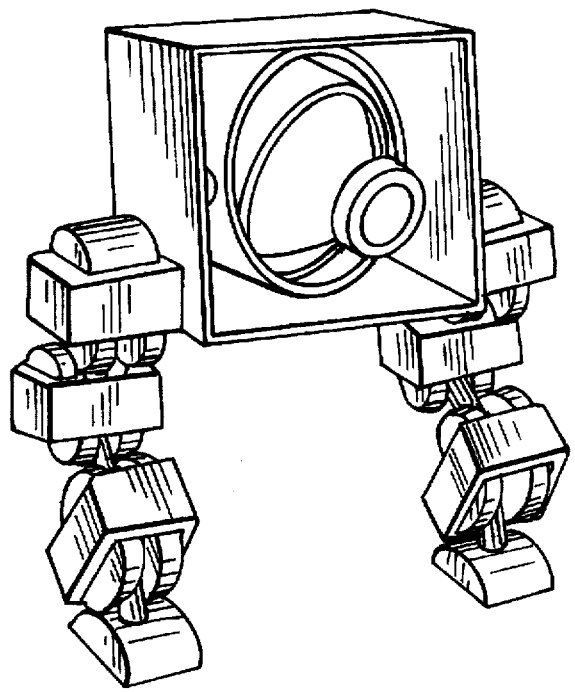
FIG. 5 is a perspective view of a two-legged walking robot.
Figure 6:
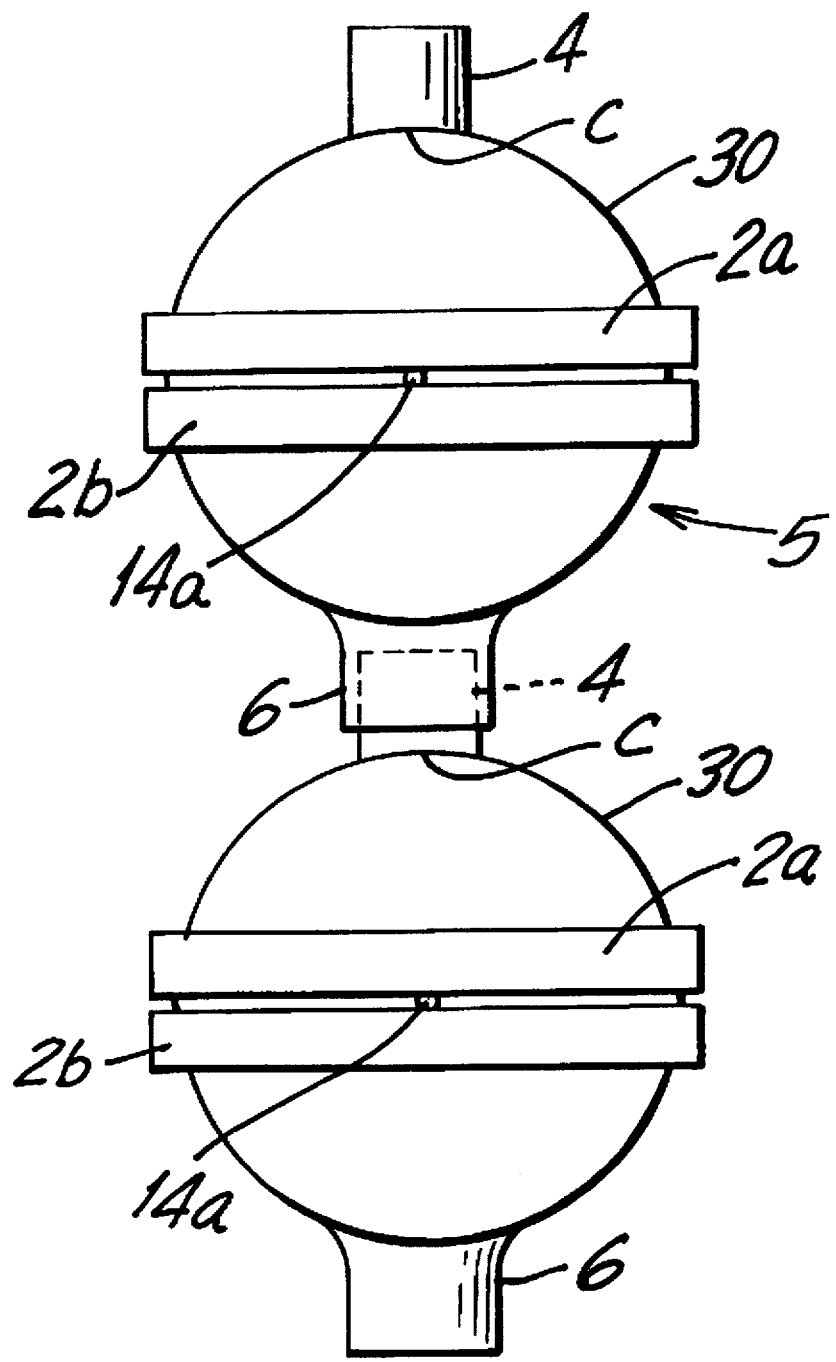
FIG. 6 is a side view of two modular direct drive motors connected together.

Referring first to FIG. 1, the preferred embodiment of the present invention includes a stator 5, a rotor 8, and means on the stator and the rotor for linkage and attachment. The motors have a sufficiently high torque-to-weight ratio so that they may be linked together to form the legs of a direct drive walking robot (micro robot).

The stator body member 5 is in the form of a cylinder or a disk having vertical and parallel side walls 32 and 33 and a ring-like wall 30 separating the side walls. It has an elongated slot-like opening 9 in its ring-like wall 30. The opening is key-hole in shape, e.g., a larger round hole and a slit portion. The diameter "D" of the larger end 10 (round opening) of the opening 9 is wider than the diameter of the shoulder portion 12 of the rotor 8 by 3%–10% and preferably 5%. The diameter "W" of the smaller end 11 (slit portion) of the opening 9 is wider than the diameter of the arm portion 4 by 3%–10% and preferably 5%. The opening 9 preferably should be 90° long, measured from the center (the hole 14). However, the opening 9 may be longer or shorter depending on the desired range of motion.

The stator 5 has a tubular bushing link portion 6. The link portion 6 is integral with the body of the stator 5. The link portion 6 is preferably attached 180° from point C which is the center of the opening 9; although its position may be changed according to the intended use of the robot. The stator 5 has holes 14a and 14b in the center of its two side walls to rotatably carry the shaft 7.

Two aluminum coils 2a and 2b are wound around the stator 5 and are retained by a silicone adhesive to the stator body. Each coil has 250 turns of aluminum wire and such wire is available from MWS Wire Industries of Westlake Village, Calif. The aluminum wire has about twice the resistance of the same size of copper wire so an aluminum coil will generate about one-half the magnetic field of a copper coil of the same size. This loss of power, however, is given up to obtain the more rapid cooling provided by aluminum. The wire has a preferred thickness (gauge) of 28 AWG (American Wire Gauge) to 32 AWG and most preferably 30 AWG (diameter 10 mils—0.255 mm). Preferably the aluminum wire used is of a square cross-section which allows for better thermal transfer, better glue bonding (between windings) and allows a smaller, more dense winding. If the wire were 30 AWG and copper, its resistance would be 105 ohms per 1000 feet (at 77° F.) and in aluminum its resistance is about twice as much.

The rotor 8 includes the tubular plastic hollow shoulder portion 12 and an integral plastic tubular arm portion 4. The arm portion 4 is permanently attached to the center of the vertical wall of the shoulder portion 12. A hole 15 is positioned in the vertical wall of the shoulder portion 12 and 90° from the arm portion 4, for the purpose of holding the shaft 7, whose preferred diameter is 0.0625 inches. Another hole 16 is positioned in the arm portion 4 and is ¾ of the length of arm portion 4 away from the shoulder portion 12. There are at least two permanent magnets 1 inside the shoulder portion 12. The optimal number of magnets 1 is four 1a–1d. Each magnet preferably is a rare earth-iron permanent magnet which is an axially polarized disk, preferably composed of NdFeB (neodynium-iron-boron) and available from Dura Magnetics Inc. of Sylvania, Ohio. The optimum rotor cylinder magnet assembly height-to-diameter ratio is 1.5:1. The four magnets pus spacer, which comprise the rotor, is cylindrical, having a diameter of 0.375 inches, a height of 0.750 inches, and has a maximum total magnetic field strength of 7000 gauss. A magnet spacer 31, which is the pivot for the shaft, is a soft iron disk 0.125 inches thick (height).

An alternative magnet consists of a series of rare earth cobalt magnets which are disc-shaped 0.75-inch diameter, 0.25 thick, each of 8200 gauss, 7300 oerstads, 16.0 Maxwells (stock C 30,962 of Edmund Scientific) or 0.5 inches diameter, 0.2-inch thick (stock C 52,867 from Edmund).

In assembly, the rotor's shoulder portion 12 is placed through the opening 9 into the stator 5 and the rotor is held in the stator by attaching the shaft 7 through the stator holes 14a, 14b, and the rotor hole 15.

The arm portion 4 extends through the opening 9 at point C which is the center of the opening 9 in its neutral (home) position (without power to the coils 2a and 2b). The arm portion 4 is rotatable in a plane. For example, if the opening is 90° wide, the arm portion 4 can be moved 45° in each direction from point C. The free end of the arm portion 4 is tubular and removably snaps into a tube (like tube 6) of the next stator in the linkage system, and is then attached through the holes 16 and 17. Such linkage to the base of the next direct drive motor forms a series of links. The telescoping fitting of the arm portion 4 and the tube 6 permits relative pivoting to change the planes of movement of the rotor's arm portion 4. Preferably the casing of the stator 5, the arm portion 4, and the shoulder portion 12 of the rotor 8 are formed of epoxy impregnated fiberglass and cloth material (epoxy glass).

A scale-independent measure of motor quality is "Q", which is a measure of the ratio of the motor's output torque to its weight. A high Q indicates that the motor has a high torque-to-weight ratio.

Q is the motor constant Km divided by a power of the mass (of the entire motor). $Q=K_m/m^n$ where m is the mass of the motor. n is selected and the preferred value is n=⅚. Km, the motor constant, is the constant of proportionality for the power consumed by the motor which is proportional to the square of the torque.

$$K_m = K_T \sqrt{Z}$$

where is the wire's resistance and $K_T$ is the amount of torque developed per unit of current.

A prototype of the direct drive motor was constructed and has the following characteristics:

| | |
|---|---|
| Velocity | 600°/sec. |
| Electrical resistance of both coils (in series) | 8 ohms |
| Torque | 0.44N at .932 m = .014 Nm |
| Peak Torque Constant | .014 Nm/Amp |

-continued

| Peak Motor Constant | .05 Nm/$\sqrt{\text{Watt}}$ |
|---|---|
| Q | .012 |
| Mass | |
| coil connectors and wiring | 1.0 gm |
| Hall sensor | 1.0 gm |
| Al. coils, total | 6.0 gm |
| Magnets stack and spacer | 10.0 gm |
| Fiberglass components | 2.5 gm |
| Total | 20.5 gm |

The sizes of this prototype are as follows:

| Stator body diameter | 1.000 inch |
|---|---|
| Stator body thickness | .500 inch |
| Arm portion, diameter | .250 inch |
| Rotor tubular portion, diameter | .406 inch |

The motors may be linked together to form a two-joint or three-joint finger. The torque to lift such a two-joint finger (two motors) is 0.006 Nm, which may be obtained using the present direct drive motor and a drive current of 0.5 amps at 8V or 4 watts. The torque required for such a three-joint finger is 0.019 Nm, which may be obtained using a drive current of 1.4 amps, which at a battery voltage of 8 volts is 11.2 watts. A linkage of 4 motors, for a leg, requires a drive current of 24 amps at 8 volts or 192 watts.

The motor control is preferably obtained using a software programmed digital computer, for example, a PC (Personal Computer) such as a Dell (TM) PC using an Intel Pentium (TM) microprocessor and a Microsoft Windows 95 (TM) operating system. The control may be by a network of PCs that communicate over the Internet (World Wide Web), i.e., telerobot control. A microcontroller such as the 68332 (Motorola) or a PIC (programmable interface controller) can be used as well.

The preferred drive circuit is connected between the PC and the coils of the stator. That circuit converts the digital commands from the PC into pulses of power which are outputted from the circuit to the coils. Preferably the circuit produces a pulse width modulated stream of pulses in which the pulses are rectangular pulses of equal amplitude. The power is changed by changing the duty cycle, i.e., the width (not amplitude) of the pulses so that the wider pulses integrate to provide higher output power. Preferably the power output circuit comprises an H-bridge power driver such as L298D (Unitrode) so that the power may be reversed, i.e., both negative and positive current for clockwise and counter-clockwise movements. The duty cycle is specified by a look-up table in the PC's memory or a separate memory microcontroller memory for each link. The position control sensor is preferably a linear or ratiomatic Hall effect device located on each side of the link to measure its flux density differential using an A to D converter of 12 bit resolution. A calibration routine then assigns a pulse width modulated (PWM) power output signal for each of the 4096 possible (controllable) positions. Thus, 90°/4096 results in motion in controlled steps of 0.021 degrees.

What is claimed is:

1. A modular direct drive motor comprising
   a. a rotor having
      i. at least one permanent magnet;
      ii. a tubular portion which holds the permanent magnet;
      iii. an arm which extends perpendicularly outwardly from the tubular portion; and
   b. a stator having
      i. a body member with a casing wall;
      ii. at least one electromagnetic coil wound around the body member;
      iii. an opening in the casing wall;
      iv. a shaft means for rotatably connecting the stator to the rotor; and
   c. a first linkage means on the body member and a second linkage means on the arm for attaching the motor between two other motors with an arbitrary twist angle.

2. The motor as in claim 1 wherein the coil is of aluminum wire.

3. The motor as in claim 2 wherein the wire is rectangular in cross-section.

4. The motor as in claim 1 wherein the arm is tubular and has a free end adapted to be inserted into a tubular linkage device on another stator.

5. The motor as in claim 1 wherein at least one aluminum coil is wound around the stator body member and the coil is wound with aluminum wire in the range 28–32 AWG.

6. The motor as in claim 1 wherein the tubular portion and the arm of the rotor are formed integrally of epoxy impregnated fiberglass.

7. The motor as in claim 1 wherein the stator body is formed of epoxy impregnated fiberglass.

8. The motor as in claim 1 wherein the opening in the casing wall of the stator is a key-hole like opening, and where the diameter of the larger end of the opening is wider than the diameter of the tubular portion of the rotor by 3%–10%, and the diameter of the smaller remainder of the opening is wider than the diameter of the arm of the rotor by 3%–10%.

9. The motor as in claim 1 wherein a number of the permanent magnets in the tubular portion of the rotor is four.

10. The motor as in claim 1 wherein the opening of the stator is about 90° wide.

11. The motor as in claim 1 wherein the coils wound around the stator are perpendicular to the center of the opening of the stator.

12. The motor as in claim 1 and comprising
    a. the stator having two parallel vertical walls and
    b. a hole in the center of each of the two vertical walls;
    c. a hole in the center of the tubular portion of the rotor; and
    d. the shaft means is a metal shaft secured into said holes and freely rotatable in the holes of the vertical walls of the stator.

13. The motor as in claim 1 wherein the arm of the rotor is at the center of the opening when power is not applied to the coils.

14. The motor as in claim 1 wherein the body member is shaped like a hollow disk with parallel side walls and a ring-like wall joining the side walls and having the opening therein.

15. The motor as in claim 1 wherein the linkage means between motors includes
    a. an extension arm of the rotor;
    b. a tubular bushing which extends outwardly from the ring-like wall of the stator;
    c. a pin securing the arm of the rotor to a tubular bushing of the stator of another motor.

16. The motor as in claim 13 wherein the tubular bushing is attached to the ring-like wall of the stator which is 180° from the center of the opening of the stator.

17. A modular direct drive motor comprising
    a. a rotor having i. at least one permanent magnet;
ii. a tubular portion which holds the permanent magnet;
iii. an arm which extends perpendicularly outwardly from the tubular portion; and
b. a stator having
i. a body member with a casing wall;
ii. at least one electromagnetic aluminum wire coil wound around the body member;
iii. an opening in the casing wall;
iv. a shaft means for rotatably connecting the stator to the rotor;
c. a first linkage means on the body member and a second linkage means on the arm for attaching the motor between two other motors.

18. The motor as in claim 17 wherein the wire is rectangular in cross-section.

19. The motor as in claim 17 wherein the arm is tubular and has a free end adapted to be inserted into a tubular linkage device on another stator.

20. The motor as in claim 17 wherein at least two aluminum coils are wound around the stator body member and the coils are wound with aluminum wire in the range 28–32 AWG.

21. The motor as in claim 17 wherein the tubular portion and the arm of the rotor and the stator body are formed of epoxy impregnated fiberglass.

22. The motor as in claim 17 wherein the opening in the casing wall of the stator is a key-hole link opening, and wherein the diameter of the larger end of the opening is wider than the diameter of the tubular portion of the rotor by 3%–10%, and the diameter of the smaller remainder of the opening is wider than the diameter of the arm of the rotor by 3%–10%.

23. The motor as in claim 17 wherein a number of the permanent magnets in the tubular portion of the rotor is four.

24. The motor as in claim 17 wherein the opening of the stator is about 90° wide.

25. The motor as in claim 17 wherein the coils wound around the stator are perpendicular to the center of the opening of the stator.

26. The motor as in claim 17 and comprising
a. the stator having two parallel vertical walls and
b. a hole in the center of each of the two vertical walls;
c. a hole in the center of the tubular portion of the rotor; and
d. a shaft means is a metal shaft secured into said holes and freely rotatable in the holes of the vertical walls of the stator.

27. The motor as in claim 17 wherein the arm of the rotor is at the center of the opening when power is not applied to the coils.

28. The motor as in claim 17 wherein the body member is shaped like a hollow disk with parallel side walls and a ring-like wall joining the side walls and having the opening therein.

* * * * *

UNITED STATES PATENT AND TRADEMARK OFFICE
CERTIFICATE OF CORRECTION

PATENT NO. : 5,672,924
DATED : Sept. 30, 1997
INVENTOR(S) : Frederick B. Hansen, et al It is certified that error appears in the above-identified patent and that said Letters Patent is hereby corrected as shown below:

On title page, item "[75] Inventors" is changed to read as follows:

-- [75] Inventors:  Frederick B. Hansen, New York, N.Y.;
                    Richard S. Wallace, Easton, Pa.   --

Signed and Sealed this

Twenty-fourth Day of February, 1998

Attest:

BRUCE LEHMAN

Attesting Officer          Commissioner of Patents and Trademarks